United States Patent [19]
Wood et al.

[11] Patent Number: 4,561,933
[45] Date of Patent: Dec. 31, 1985

[54] XEROGRAPHICS DEINKING

[75] Inventors: Donald L. Wood, Houston, Tex.; Donald C. Wood, Des Plaines, Ill.

[73] Assignee: Shell Oil Company, Houston, Tex.

[21] Appl. No.: 723,705

[22] Filed: Apr. 15, 1985

Related U.S. Application Data

[63] Continuation of Ser. No. 542,636, Oct. 17, 1983, abandoned.

[51] Int. Cl.$^4$ ............................................. D21B 5/02
[52] U.S. Cl. ......................................... 162/5; 162/55
[58] Field of Search ..................................... 162/5, 55

[56] References Cited

U.S. PATENT DOCUMENTS 4,162,186  7/1979  Wood et al. ............................ 162/5
4,276,118  6/1981  Quick ...................................... 162/5

Primary Examiner—William F. Smith

[57] ABSTRACT

A process for the deinking of xerographically printed wastepaper to produce reclaimed stock having high brightness and low dirt count. The process centers upon contact between a wastepaper pulp and an aqueous medium of alkaline pH containing a deinking agent consisting of a mixture of one or more $C_5$ to $C_{20}$ alkanols with nonionic surfactant to form a suspension of the ink in the aqueous medium. The deinking agent suitable for practice of the invention necessarily contains for every 10 parts by weight between 3 and 5 parts of alkanol and between 5 and 7 parts of nonionic surfactant, and is present in the aqueous medium in an amount between about 0.2 and 2.0 percent by weight, calculated on the dry weight of the pulp.

19 Claims, No Drawings

XEROGRAPHICS DEINKING

This is a continuation of application Ser. No. 542,636, filed Oct. 17, 1983 abandoned.

BACKGROUND OF THE INVENTION

This invention relates to a process for the removal of ink from printed wastepaper in the course of reclaiming the fiber content of the waste for reuse in the manufacture of new paper. More particularly, the invention relates to a process for the deinking of xerographically printed paper.

Wastepaper has long served as a source of the raw fiber materials used in papermaking. Traditionally, fiber from wastepaper was utilized only in the production of low grade paper and paperboard products. Today, however, greater utilization of reclaimed fiber (about 25 percent of the total fiber used in papermaking) has provided incentive for taking steps to upgrade the reclaimed product. These steps include treatment to effectively remove ink from waste fibers in order to permit their use in the manufacture of high quality papers.

In the course of the conventional paper reclamation process of interest, deinking procedures include steps for converting the wastepaper to pulp and contacting the pulp with an alkaline aqueous deinking medium containing a chemical deinking agent. The physical pulping and the alkalinity of the aqueous medium cause the removal of ink from the pulp fiber and the deinking agent produces a suspension, (and/or dispersion) of the ink particles thus removed into the aqueous medium. The resulting mixture is subsequently treated to separate the suspended ink from the pulp.

A variety of materials, particularly surfactants and mixtures of surfactants are known to be useful as deinking agents in such a process, at least when the process is applied to the deinking of such common wastepaper stocks as newsprint, book, magazine, and ledger. It is recognized, however, that conventional processes have not been particularly successful in specific application to xerographically printed wastepapers. The difficulty encountered in the deinking of xerographics has been attributed to the character of the xerographic ink, specifically the binder, which is fundamentally different from that used in other printing processes. For example, in distinction to the common oil or resin binders of other inks, the xerographic ink binder is typically a polymeric material (e.g. polyethylene) which during the printing process is fixed to the paper by the application of heat.

The ever-increasing utilization of xerographic printing has made the reclamation of xerographic waste economically attractive. Accordingly, the object of the present invention is a deinking process which is effective in the treatment of xerographic waste stock.

With specific regard to certain nonionic surfactants which are useful in the process of the present invention, it has been established (U.S. Pat. No. 4,162,186) that they may have advantage in general deinking service from the standpoint of both performance in ink removal and also biodegradability in process effluents. It has been found, however, that neither such a nonionic surfactant used individually nor a combination of two nonionic surfactants as described by the aforementioned patent is effective as a deinking agent in application to xerographically printed waste.

SUMMARY OF THE INVENTION

The present invention provides a process which can be effectively applied to the deinking of xerographically printed wastepapers. In essence the invention is directed to discovery of a deinking agent which combines nonionic surfactant and $C_5$ to $C_{20}$ alkanol in specified relative proportions. When applied under limited conditions of temperature and pH, the deinking agent results in enhanced separation and removal of ink particles from pulp fibers and produces a deinked pulp suitable for use in the preparation of reclaimed papers having high brightness and essentially free of ink specks.

Accordingly, the invention can be briefly described as a process utilizing the said deinking agent for the deinking of xerographically printed wastepaper, which comprises (a) converting the wastepaper to pulp, (b) contacting the pulp with the deinking agent in an aqueous medium of alkaline pH at a temperature between about 40° C. and 100° C. to form a suspension of the xerographic ink, and (c) treating the resulting pulp containing medium, for example, by washing or flotation, to remove ink therefrom. It is necessary to the invention that the said deinking agent contain, for every 10 parts by weight, between 3 and 5 parts of $C_5$ to $C_{20}$ alkanol and between 5 and 7 parts nonionic surfactant, and further that the aqueous medium contain the deinking agent in an amount between about 0.2 and 2.0 percent by weight, calculated on the dry weight of the pulp present.

DESCRIPTION OF THE PREFERRED EMBODIMENTS

The invention is applicable to the deinking of any xerographically printed wastepaper. Xerography refers to an electrostatic printing process employing a photoconductor to produce an image from charged ink particles which can be transferred to and fixed on paper. The distinction between xerography and other printing processes which is mostd important to the present invention relates, however, more to the nature of the xerographic ink than to manner in which it is applied. Xerographic ink contains as binder one or more polymers (e.g., polyethylene) or like substances which soften upon heating to result in physical adhesion to paper. The specific combination of alkanol and nonionic surfactant employed as deinking agent in the process of the invention has been found to be particularly effective in aiding removal and separation of such ink from wastepaper fibers. Accordingly, the invention is in its broadest sense applicable to papers printed with xerographic inks, whether the ink was applied by an electrostatic method or other printing techniques.

The invention comprises three processing steps: the first, a step to reduce the wastepaper feed to pulp, the second, a contact between the pulp and an alkaline aqueous medium containing a deinking agent of critical composition to produce a suspension of the ink in the aqueous medium, and, the third, a treatment of the resulting pulp-containing medium to remove suspended ink particles therefrom. The first and third steps of this sequence are suitably practiced using conventional techniques and equipment. In essence, the invention centers upon the second such step, particularly upon the composition of the deinking agent and its performance in the processing of the xerographically printed wastepaper pulp.

A necessary component of this deinking agent for purposes of the invention is a higher alkanol, i.e., an alkanol having a carbon number in the range from about 5 to 20. Alkanols in the carbon number range from about 8 to 16, particularly 9 to 15, are considered preferred. Preference may also be stated for alkanols having a carbon structure that is linear (straight chain) or only moderately branched. Predominantly linear alkanols are preferred for reasons relating to biodegradability in process effluents, rather than to deinking performance. Similarly, primary alkanols are preferred, although the invention may be suitably practiced using secondary or tertiary alkanols.

For purposes of the invention, the deinking agent necessarily combines the specified alkanol with a nonionic surfactant. The particular nature of the nonionic surfactant is not critical to the practice of the invention and use may suitably be made of any of the wide variety of nonionic surfactants known in the art. Specific mention may be made of the nonionic surfactants recognized for their utility in related deinking processes, particularly those described in the aforementioned U.S. Pat. No. 4,162,186, the teachings of which relative to suitable and preferred classes of nonionic surfactants are incorporated herein by this reference thereto. While that patent draws a distinction between water-soluble and oil-soluble nonionic surfactants it is to be understood that no such distinction is necessary in describing the present invention. The nonionic surfactant applied to the treatment of xerographic waste according to the invention is suitably either an oil-soluble or a water-soluble surfactant, or a mixture comprising both.

Particularly preferred as the nonionic surfactant in the invention is a polyalkyleneoxy ether, e.g., a polyethyleneoxy ether, of an alcohol or mixture of alcohols, particularly a higher alkanol or an optionally alkyl-substituted phenol. Such ethers are well known nonionic surfactants, commonly prepared by the addition reaction of a $C_2$ to $C_4$ alkylene oxide with the alcohol in the presence of either an acid or base catalyst. Most preferred are the polyethyleneoxy derivatives (ethoxylates) of the same $C_5$ to $C_{20}$ alkanols which serve as the other component of the deinking agent of this invention. Again, preference is expressed for ethoxylates of primary, predominantly linear alkanols having 8 to 16, particularly 9 to 15 carbon atoms. Such alkylenoxy compounds are generally prepared as mixtures of molecules having different numbers of ethylene oxide adducts. Although the average number of such adducts per molecule may determine many of the properties of the surfactant (e.g., water and oil solubility), this aspect is not found to be critical to the invention. Thus, the average adduct number of such nonionic surfactants for purposes of the invention suitably varies over a wide range, e.g., 1 to 20. Preferably, the average adduct number of a polyalkyleneoxy ether surfactant is between about 1 and 10, while a relatively low average adduct number, for instance, between about 1 and 5, is considered most preferred.

If desired, the process of the invention can be suitably applied to the deinking of mixtures of xerographically-printed papers with other wastestocks. As an example of a preferred treatment for such mixtures, the invention is practiced utilizing as the nonionic surfactant component of the deinking agent a nonionic surfactant known for use in deinking the other wastestocks present, for instance, a nonionic surfactant mixture as described in U.S. Pat. No. 4,162,186. Similarly other known deinking process agents and additives are suitably present in aqueous medium, in addition to the specified agent combining nonionic surfactant and alkanol components.

It has been found that the relative proportions of the alkanol and nonionic surfactant components of the deinking agent are critical to the successful practice of the invention. Specifically, it is necessary that for every 10 parts by weight of the deinking agent, between 3 and 5 parts are the specified alkanol component and the remaining 5 to 7 parts are the specified nonionic surfactant. Preference may be expressed for a deinking agent consisting of 3.5 to 5 parts alkanol and 5 to 6.5 parts nonionic surfactant, while a deinking agent consisting of between 3.7 and 4.7 parts alkanol and 5.3 to 6.3 parts nonionic surfactant is more preferred. Considered most preferred is a deinking agent consisting of about 4.0 to 4.5 parts alkanol and 5.5 to 6.0 parts nonionic surfactant.

The invention is necessarily applied to the treatment of a wastepaper pulp, that is, to a feedstock which has been substantially reduced to the form of individual fibers. Pulping is very suitably conducted using any of the various conventional processes and equipment designed for this purpose. Most conveniently, the feedstock is treated in a device known as a "hydropulper", which produces a slurry of the fibers in water.

After the pulping step, the resulting fibers are contacted in a aqueous medium with the deinking agent. This contact step may suitably be conducted in the pulping equipment, for instance, by simply adding deinking agent and caustic to the aqueous slurry of the hydropulper. Alternatively, the contact may be carried out using separate processing equipment which provides for agitation of the aqueous pulp slurry. For the contact step, the pulp is present in the aqueous medium in a quantity typically, but not necessarily, between about 0.5 and 5.0 percent by weight (%w), calculated as the dry weight of the wastepaper feed relative to total weight of the slurry formed. In preferred practices the slurry contains between about 1 and 6%w (percent by weight) pulp fiber. The quantity of deinking agent present in the slurry is very suitably between about 0.2 and 2.0%w, calculated on dry fiber weight. Preference may be expressed for a quantity of deinking agent that is between about 0.5 and 1.5%w, while a quantity of about 0.75 to 1.0%w is considered most preferred.

During contact between pulp fiber and deinking agent it is further necessary to the invention that the aqueous contact medium be maintained at alkaline pH. A pH value greater than about 8 is considered preferred, a pH between about 9 and 13 more preferred and a pH between about 10 and 12 most preferred. The alkalinity is typically maintained by addition to the aqueous contact medium of a base, particularly caustic or sodium silicate in a quantity between about 1 and 4%w calculated on dry weight of the pulp fiber.

In addition to water, pulp, base, and deinking agent, the contact slurry may further suitably contain other substances conventionally employed in deinking processes, e.g., bleaches and brighteners, solvents, antifoam agents, and water softeners. If desired, other deinking agents may be present in addition to the specified combination of alkanol and nonionic surfactant components. However, the use of additional deinking agents is neither necessary nor preferred.

Processing of the pulp slurry during contact with the deinking agent is preferably carried out at elevated temperature, particularly a temperature between about 40° C. and 100° C. The invention has been found to be particularly effective at a temperature in the range of from about 45° C. to 80° C., while a contact temperature in the range from about 50° C. and 75° C. is considered optimal.

The time for which contact is maintained between the wastepaper pulp and the aqueous deinking medium is not critical for purposes of the invention. However, a contact time greater than about 10 minutes is preferred from the standpoint of deinking performance. From the standpoint of the process efficiency, preference may be stated for a contact time that is between about 20 minutes and one hour, while contact for between about 30 and 45 minutes is considered most preferred.

Contact between pulp fiber and deinking agent in the alkaline aqueous medium accomplishes the dispersion of ink particles into the medium. A further treatment of the pulp-containing mixture is then necessary to remove suspended ink particles therefrom. For this purpose the invention suitably makes use of techniques commonly applied in deinking practices, including those treatments known as washing and flotation. In washing the ink particles are rinsed from the pulp mixture by contact with a flow of water, usually a contercurrent flow relative to the pulp. Among the devices commercially utilized for pulp washing and suitable for service in the practice of the invention mention may be made of the sidehill screen, the gravity decker or drum washer, the inclined screw extractor, the screw press and centrifugal cleaners of various designs. Flotation is an alternative to washing in which air is bubbled through the pulp. Ink particles selectively adhere to the bubbles and float to the surface, forming a froth which can be skimmed off. Without intention that the invention be limited to one mechanism or theory of operation, it is thought that the presence of the alkanol in the deinking process serves to produce an agglomeration of ink particles suspended in the aqueous medium, placing the ink in a form which facilitates its separation from pulp fibers during washing, flotation, or the like.

It will be understood that in addition to pulping, contact, and ink removal steps described herein, the invention may be practiced using other process steps as are employed in wastepaper reclamation operations in general and deinking in particular.

Certain preferred embodiments of the invention are further illustrated through reference to the following examples:

EXAMPLE 1

This example illustrates the deinking of xerographically printed paper carried out according to the process of the invention using as deinking agent a combination of (a) 42%w of a mixture of $C_{12}$ to $C_{15}$ predominantly linear and primary alkanols and (b) 58%w of alkanol ethoxylate molecules. The ethoxylate molecules had been prepared by an addition reaction (carried out in the presence of a conventional potassium hydroxide catalyst) between ethylene oxide and the same $C_{12}$ to $C_{15}$ alkanols. The number of ethylene oxide adducts per resulting ethoxylate molecule averaged about 3.6.

In actual practice, the deinking agent containing the 42%w alkanol and 58%w ethoxylate had been prepared by blending 30 parts by weight of the $C_{12}$ to $C_{15}$ alkanols with 70 parts by weight of the resulting ethoxylate reaction product. As a result of the addition reaction by which it was prepared, the 70 parts by weight of this product included 12 parts by weight of unethoxylated $C_{12}$ to $C_{15}$ alkanol. Thus the blended deinking agent contained 42%w alkanol and 58%w ethoxylate.

To test the performance of the invention, the following procedures were carried out for the deinking of typical xerographically printed (XEROX 4500)paper.

Sample preparation

Xerographically printed paper (80 g) was shredded by hand and mixed well. Unprinted margins of the papers were trimmed before shredding, and collected for use as a blank standard.

Hydropulping

Sufficient tap water was added to the shredded paper to bring the total volume to 1.33 liters, and NaOH was added to adjust pH to between 10 and 11. The paper in the mixture was then disintegrated into pulp by blending for five minutes in a commercial 4-liter blender.

Deinking

The disintegration mixture was diluted with additional tap water to bring its total volume to about 4 liters. Temperature of the added tap water was preadjusted to result in a temperature of 55° C. for the total mixture. The total mixture was then divided into four portions, each 1 liter in volume and containing 20 g of pulp (i.e., a 2% consistency). To each portion was the added NaOH (if necessary) to maintain the desired pH of 10–11 and 0.2g of the deinking agent (1%w calculated on weight of pulp). Deinking was carried out for one hour with agitation (mechanical stirrer) to aid contact between pulp fiber and the aqueous medium containing the deinking agent.

Washing

Each deinked pulp solution was next drained onto a #20 ASTM sieve. Pulp collected in the sieve was rinsed under running tap water and then transferred to a beaker containing about 500 ml water. The beaker contents were stirred by hand for a few minutes and then drained into the sieve. After three repetitions of these washings procedures, the collected pulp was transferred to a container and further tap water added to bring volume up to 1 liter.

Paper making

The one liter pulp solution was dispersed (250 ml of solution and 5 g of pulp at a time) in 7 liter of tap water in a TMI TAPPI (Technical Association of the Pulp and Paper Industry) Standard Sheet Machine. In the machine, pulp was deposited forming a wet sheet, while water drained rapidly. The sheet thus formed was covered with a piece of thick wet filter paper followed by a piece of thick dry filter paper and the several layers then squeezed by rolling with a 30 lb. rolling pin. The layers were next removed from the apparatus and the prepared sheet separated from the filter papers. Finally, the prepared sheet was placed between four thick filter papers (two above and two below), pressed with a force of 50 psig, and dried between fresh thick filter papers at room temperature in the dark for 24 hours.

Papers ("handsheets") prepared via deinking of printed xerographic stock in this manner were analyzed for brightness, in comparison to handsheets prepared from the blank standard using the same procedures and also in comparison to the original xerographically printed feedstock paper. Brightness measurements were made on the basis of percent light reflection from the sheet, using a standardized Technidyne S-4 Brightness Tester. Eight measurements were made for each sheet, one at the center of each of four quadrants on both sides, and the eight values averaged for the sheet. Normally the eight separate measurements for the sheet varied over a range of no more than 1.0%. Reported brightness readings were the average of the brightness results for at least three similarly processed sheets.

Brightness of the original (untreated) printed stock was measured at 65 to 68%. The sheets prepared from this printed stock, applying procedures which included a deinking treatment in accordance with the invention, were found to have an average brightness of 74%, the same value as for sheets prepared from blank (unprinted) xerographic stock utilizing the same procedures. These data indicate that practice of the process of the invention resulted in essentially complete ink removal.

COMPARATIVE EXAMPLES 2–4

The procedures of Example 1 were repeated, with the substitution or other deinking agents known in the prior art, for comparison with processing according to the invention.

For Comparative Example 2, the deinking agent used was the same as that used in Example 1 of U.S. Pat. No. 4,162,186: a mixture containing about 80%w of ethoxylated $C_{12}$ to $C_{15}$ primary linear alkanols, having an average of about 7 moles of ethylene oxide per mole of alkanol, and about 20%w of ethoxylated $C_{12}$ to $C_{15}$ primary linear alkanols having about 3 moles of ethylene oxide per mole of alkanol. (This mixture naturally contains a small amount, about 6%w, of $C_{12}$ to $C_{15}$ alkanol resulting from the conventional methods used in preparation of the two ethoxylate components.)

For Comparative Example 3, the deinking agent was ethoxylated $C_{14}$ to $C_{15}$ primary linear alkanols, having an average of about 7 moles of ethylene oxide per mole of alkanol (and containing about 3%w unethoxylated alkanol).

For Comparative Example 4, the deinking agent was an ethoxylate of nonylphenol, having an average of about 9.5 moles of ethylene oxide per mole of nonylphenol. (Deinking with such nonylphenol ethoxylates is described in U.S. Pat. No. 3,446,696 and in Examples II–V of U.S. Pat. No. 4,162,186).

Results of Comparative Examples 2–4 are presented in the following Table, together with the result for Example 1.

TABLE I

|  | Brightness |
|---|---|
| Original printed stock (no deinking treatment) | 65–68% |
| Blank (no print) treated as in Example 1 | 74% |
| Example 1 (in accordance with with the invention) | 74% |
| Comparative Example 2 | 70% |
| Comparative Example 3 | 71% |
| Comparative Example 4 | 72% |

The Table indicates that only under practice of the invention did the processed printed stock approach the blank stock in brightness.

EXAMPLES 5–10 AND COMPARATIVE EXAMPLES 10 AND 11

A series of experiments were conducted to illustrate the suitability of various alkanol and alkanol ethoxylate combinations as deinking agents in the process of the invention. Procedures of Example 1 were again followed in the preparation, hydropulping, deinking, washing, and papermaking steps. With the exception that the dilution of the disintegration mixture at the beginning of the deinking step was made to provide a mixture of 30 g pulp per liter (i.e., a 3% consistency).

In Example 5, the deinking agent was the same as that employed in Example 1.

In Example 6, the deinking agent was a combination of (a) 43%w of a mixture of $C_{14}$ to $C_{15}$ predominantly linear primary alkanols and (b) 57%w of an ethoxylate molecule prepared by addition of ethylene oxide to the same $C_{14}$ and $C_{15}$ alkanol. The number of ethylene oxide units per ethoxylate molecule averaged about 2.5. In practice the deinking agent has been prepared by mixing 25 parts by weight of the alkanols with 75 parts by weight of an ethoxylation reaction product mixture. Of the 75 parts by weight, 18 were unreacted alkanol.

In Example 7, the deinking agent was a combination of (a) 40%w of a mixture of $C_{12}$ and $C_{13}$ alkanols and (b) 60%w of alkanol ethoxylate molecules. In practice the agent was prepared in the following manner. First, one mole of $C_{12}$ and $C_{13}$ alkanols was reacted with 6.5 moles of ethylene oxide per mole of alkanol using a conventional alkali metal catalyst. After addition of acid to neutralize the catalyst, the resulting product mixture was partially distilled to yield an overhead rich in unreacted alkanol. This overhead (40%w alkanol and 60%w ethoxylate) was employed directly as deinking agent.

In Example 8, the deinking agent was a combination of (a) 43%w of a mixture of $C_{14}$ and $C_{15}$ alkanols and (b) 57%w of a mixture of alkanol ethoxylates. The agent had been prepared by mixing 15 parts by weight of $C_{14}$ and $C_{15}$ alkanols with the overhead of the distillation of the product of the reaction of $C_{14}$ and $C_{15}$ alkanols with 7 moles of ethylene oxide per mole of alkanol.

In Example 9, the deinking agent was a combination of (a) 45%w of $C_{12}$ and $C_{13}$ primary, linear alkanols and (b) 55%w of ethoxylate molecules. This combination resulted directly from an addition reaction between equimolar quantities of ethylene oxide and the $C_{12}$ and $C_{13}$ alkanols.

In Example 10, the deinking agent was a combination of (a) 45%w $C_{14}$ and $C_{15}$ primary linear alkanols and (b) 55%w of ethoxylate molecules, which resulted directly from an addition reaction between equimolar quantities of ethylene oxide and the $C_{14}$ and $C_{15}$ alkanols.

In Comparative Examples 11 and 12, the deinking agents employed were the same as in Comparative Examples 3 and 4, respectively.

Results for Examples 5–10 and Comparative Examples 11 and 12 are presented in Table II

TABLE II

|  | Deinking Agent Composition (% w) | | | |
|---|---|---|---|---|
|  | Alcohol | total ethoxylate | lower ethyoxylate | Brightness (%) |
| Example |  |  |  |  |
| Original printed stock (no deinking treatment) |  |  |  | 67–68 |
| 5 | 42 | 58 | 17 | 74–75 |
| 6 | 43 | 57 | 23 | 74–75 |
| 7 | 40 | 60 | 39 | 74 |
| 8 | 43 | 57 | 29 | 75 |
| 9 | 45 | 55 | 36 | 75 |
| 10 | 45 | 55 | 36 | 75 |
| Comparative Example |  |  |  |  |
| 11 |  |  |  | 72 |
| 12 |  |  |  | 72 |

Table II reports, for each example of the invention, the quantity of "lower ethoxylate" in the deinking agent, by which is meant the quantity of ethoxylate molecules having either one or two ethylene oxide adduct units in the molecule. As the examples show, deinking performance is not significantly dependent upon ethylene oxide adduct number for the ethoxylate component.

EXAMPLE 13

Xerographically-printed paper was subjected to deinking treatment according to the invention, under the procedures which follow. Flotation techniques were used to separate suspended ink from the pulp.

The printed pages were first trimmed to remove unprinted margins and then cut into squares, approximately ½ inch square. To 12 g of paper in a one liter beaker was added 12 ml of a 1% aqueous solution of deinking agent, 18 ml of a 2% aqueous solution of NaOH, and 400 ml of tap water. The deinking agent added was the same as that used in Example 1. For deinking, the mixture was heated to between 60° and 70° C. with stirring (metal blade mechanical stirrer) for 30 to 45 minutes. The resulting pulp mixture was then deflaked and blended (in a common kitchen blender) for 10 seconds, applying a repeated on-off action. A 200 ml aliquot of the blended mixture was diluted with 40° to 45° C. tap water to a total volume of 600 ml which contained 6 g of paper pulp (a 1% consistency). The 600 ml slurry was transferred to an 800 ml beaker equipped with a magnetic stirrer and a fritted glass tube connected to an air supply. As air was slowly bubbled in, foam formed on top of the slurry and was removed with a skimmer or vacuum tube. Air bubbling and foam removal were continued until the foam appeared to be free of ink (about 10 minutes). Two handsheets were prepared from the resulting pulp slurry, using the paper making procedure described in Example 1 above.

The handsheets thus prepared were analyzed for brightness, again using the procedures described in Example 1.

The handsheets were also visually inspected (eye and/or microscope) for ink ("dirt") particles. Dirt count (in ppm) was carried out according to TAPPI standard procedure T437 pm-78, which takes into account particle size. A 5.5 cm by 5.5 cm area of the handsheet was counted on represent the total sheet. An area was counted on both sides of the sheet and the two values added. An alternate dirt count (reported in specks per gram of paper) was also obtained by counting all specks regardless of particle size. The count again taken (for representative areas of both sides of the sheet) was divided by the weight of the handsheet (air dried).

Results are presented in Table III, both for the deinking of the printed paper and for a similar treatment of the blank, unprinted paper margins.

COMPARATIVE EXAMPLES 14 and 15

Thke procedures of Example 13 were repeated, substituting deinking agents not in accordance with the invention. For Comparative Example 14, the deinking agent was the same as that used in Comparative Example 3. For Comparative Example 15, the deinking agent was the same as that used in Comparative Example 4. The results are tabulated, together with those of Example 13, in Table III.

TABLE III

|  | Brightness (%) | Dirt Count ppm | Specks/g |
|---|---|---|---|
| Example |  |  |  |
| 13 | 76–80 | 10–200 | 5–15 |
| *blank | 78–80 | 10 | 5 |
| Comparative Example |  |  |  |
| 14 | 75–78 | 300–1000 | 100–1000 |
| 15 | 72–79 | 25–1000 | 20–500 |

*The blank represents unprinted paper, treated as in Example 13.

EXAMPLES 16–19

The process of the invention was applied to a variety of xerographically printed stocks, printed by various xerographic processes and machines. The procedures of Example 13 were followed. Results present in Table IV, show good deinking performance for each of the print sources.

TABLE IV

| Xerographic print source | Brightness of handsheet |
|---|---|
| XEROX 4500 | 76–80 |
| IBM Series III | 78 |
| KODAK Ektaprint 150 | 74 |

What is claimed is:

1. A process for the deinking of wastepaper stocks comprising xerographically printed paper, which comprises steps for
   (a) converting the wastepaper to a pulp,
   (b) contacting the pulp with an aqueous medium of alkaline pH containing a deinking agent consisting of a mixture of (i) one or more $C_8$ to $C_{16}$ alkanols and (ii) a mixture of alcohol ethoxylates, to form a suspension of the ink in the aqueous pulp-containing medium, said deinking agent containing for every 10 parts by weight of alkanol and alcohol ethoxylates between 3.7 and 4.7 parts alkanol and between 5.3 and 6.3 parts alcohol ethoxylates, said aqueous medium containing the deinking agent in an amount between about 0.2 and 2.0 percent by weight, calculated on dry weight of the pulp, and said contact being carried out at a temperature of between about 40° and 100° C., and
   (c) treating the resulting pulp-containing medium by washing or flotation to remove suspended ink therefrom.

2. The process of claim 1, wherein the mixture of alcohol ethoxylates is a mixture of the ethoxylates of one or more $C_8$ to $C_{16}$ alkanols.

3. The process of claim 2, wherein the deinking agent consists of between 4.0 and 4.5 parts alkanol and between 5.5 and 6.0 parts alcohol ethoxylates.

4. The process of claim 2, wherein the average number of ethylene oxide adducts in the mixture of alcohol ethoxylate molecules is between about 1 and 10.

5. The process of claim 4, wherein the deinking agent consists of between 4.0 and 4.5 parts alkanol and between 5.5 and 6.0 parts alcohol ethoxylates.

6. The process of claim 4, wherein the deinking agent consists of about 4.2 parts alkanol and about 5.8 parts alcohol ethoxylates.

7. The process of claim 4, wherein the contact is carried out for a time between about 20 minutes and one hour and at a temperature between about 45° C. and 80° C.

8. The process of claim 7, wherein the aqueous medium has a pH between about 9 and 13.

9. The process of claim 8, wherein the deinking agent consists of between 4.0 and 4.5 parts alkanol and between 5.5 and 6.0 parts alcohol ethoxylates.

10. The process of claim 8, wherein the deinking agent consists of a mixture of (i) one or more $C_9$ to $C_{15}$ alkanols and (ii) a mixture of the ethoxylates of primary, predominantly linear $C_9$ to $C_{15}$ alkanols having an average of between about 1 and 5 ethylene oxide adducts in the mixture of alcohol ethoxylate molecules.

11. The process of claim 10, wherein the deinking agent consists of between 4.0 and 4.5 parts alkanol and between 5.5 and 6.0 parts alcohol ethoxylates.

12. The process of claim 10, wherein the deinking agent consists of about 4.2 parts alkanol and about 5.8 parts alcohol ethoxylates.

13. The process of claim 7, wherein the deinking agent consists of between 4.0 and 4.5 parts alkanol and between 5.5 and 6.0 parts alcohol ethoxylates.

14. The process of claim 1, wherein the deinking agent consists of between 4.0 and 4.5 parts alkanol and between 5.5 and 6.0 parts alcohol ethoxylates.

15. The process of claim 1, wherein the deinking agent consists of about 4.2 parts alkanol and about 5.8 part alcohol ethoxylates.

16. A process for the deinking of wastepaper stock comprising xerographically printed paper, which comprises steps for (a) converting the wastepaper to a pulp, (b) contacting the pulp with an aqueous medium of a pH between about 10 and 12 containing a deinking agent consisting of a mixture of (i) one or more $C_9$ to $C_{15}$ alkanols and (ii) ethoxylates of $C_9$ to $C_{15}$ alkanols, to form a suspension of the ink in the aqueous pulp-containing medium, said deinking agent containing for every 10 parts by weight of alkanol and alkanol ethoxylate between 4.0 and 4.5 parts alkanol and between 5.5 and 6.0 parts alcohol ethoxylate, said aqueous medium containing the deinking agent in an amount between about 0.5 and 1.5 percent by weight, calculated on dry weight of the pulp, and said contact being carried out for a time between about 30 and 45 minutes at a temperature of between about 50° C. and 75° C., and (c) treating the resulting pulp-containing medium by washing or flotation to remove suspended ink therefrom.

17. The process of claim 15, wherein the $C_9$ to $C_{15}$ alkanol ethoxylates have an average number of ethylene oxide adducts between about 1 and 10.

18. The process of claim 17, wherein the average number of ethylene oxide adducts is between about 1 and 5.

19. The process of claim 18, wherein the deinking agent consists of about 4.2 parts alkanol and about 5.8 parts $C_9$ to $C_{15}$ alkanol ethoxylates.

* * * * *